United States Patent [19]

Yoshiyuki: Yasui

[11] Patent Number: 5,289,894
[45] Date of Patent: * Mar. 1, 1994

[54] STEERING SYSTEM FOR A VEHICLE

[75] Inventor: Yoshiyuki: Yasui, Davis, Calif.

[73] Assignee: Imra America, Inc., Ann Arbor, Mich.

[*] Notice: The portion of the term of this patent subsequent to Jan. 18, 2011 has been disclaimed.

[21] Appl. No.: 861,103

[22] Filed: Mar. 31, 1992

[51] Int. Cl.⁵ .............................................. B62D 5/08
[52] U.S. Cl. ..................................... 180/141; 180/142
[58] Field of Search ............... 180/132, 140, 141, 142, 180/148

[56] References Cited

U.S. PATENT DOCUMENTS

| | | | |
|---|---|---|---|
| 4,049,961 | 9/1977 | Marcy | 205/202 |
| 4,558,759 | 12/1985 | Baatrup et al. | 180/132 |
| 4,669,567 | 6/1987 | Nakamura et al. | 180/141 X |
| 4,700,960 | 10/1987 | Miki et al. | 180/140 X |
| 4,768,602 | 9/1988 | Inoue et al. | 180/140 |
| 4,836,319 | 6/1989 | Haseda et al. | 180/142 |
| 4,871,952 | 10/1989 | Ishizaka et al. | 180/142 |
| 4,909,342 | 3/1990 | Janson et al. | 180/140 |
| 4,909,343 | 3/1990 | Mouri et al. | 180/142 |
| 4,955,445 | 9/1990 | Kanas | 180/133 |
| 5,080,185 | 1/1992 | Kondo et al. | 180/140 |

FOREIGN PATENT DOCUMENTS 1414206 11/1975 United Kingdom .

Primary Examiner—Margaret A. Focarino
Assistant Examiner—Victor E. Johnson
Attorney, Agent, or Firm—Burns, Doane, Swecker & Mathis

[57] ABSTRACT

A power steering system incorporates a stability augmentation control program so as to provide hydrostatic power steering to the front and/or rear wheels of a vehicle. The hydrostatic steering system utilizes a control piston responsive to movement of a rack element of the rack and pinion steering connection of the vehicle steering system. A steering wheel angle sensor is connected to the steering shaft for providing an output angle signal to the steering controller and an electric motor of the system is responsive to a command signal generated by the steering controller. The steering of the wheels of the vehicle is then controlled in response to the steering wheel angle, vehicle speed and yaw rate of the vehicle. The controller receives inputs from each of the sensors so as to provide a control signal permitting stable steering control of the front wheels of the vehicle. The system is also applicable for providing steering for rear wheels of the vehicle in which a position sensor provides a control signal to the controller for controlling hydrostatic power to a control chamber for a steering rod of the rear wheels of the vehicle.

28 Claims, 7 Drawing Sheets

STEERING SYSTEM FOR A VEHICLE

BACKGROUND OF THE INVENTION

1. Related Applications

The present application is related to application Ser. No. 475,899, filed on Dec. 12, 1991 and entitled "Steering Control Apparatus." Applications entitled "Hydrostatic Power Steering System" and "Vehicle Stability Augmentation System" were filed on Mar. 27, 1992.

The present invention relates to a vehicle steering system in conjunction with a hydraulic and electric steering control system for a motor vehicle and more particularly, for controlling the steering angle of the front and/or rear wheels of the vehicles in accordance with the state of movement of the motor vehicle to which the system is applied.

The power steering portion of the control system is provided to boost the steering torque or force for assisting the drivers torque input. The torque applied to the steering shaft is essentially fed back to a controller. The stability augmentation portion of the control system is provided to enhance the stability and maneuverability of the vehicle. Vehicle behavior such as yaw rate, lateral acceleration, etc., is fed back to the controller so as to permit the front and/or the rear wheel angle to be controlled.

SUMMARY OF THE INVENTION

It is therefore an object of the present invention to provide a new and improved steering apparatus for front and/or rear wheels of a vehicle which is capable of performing vehicle steering with high response and control accuracy while at the same time ensuring reliability of operation and precise control of the vehicle.

In accordance with the present invention, there is provided a hydraulic steering system including an electric motor and a hydraulic pump. A chamber of the system is divided by a valve land into first and second portions, each of which are connected to first and second hydraulic lines. There is provided a hydraulic control cylinder positioned at a hollow end of rack with a steering rod having a first end received in the hollow end of the rack and a second end of the rod received in the control cylinder. A control piston is located on the steering rod and positioned interiorly of the control cylinder. At least a pair of vehicle wheels are connected to the steering rod by a linkage mechanism. A steering wheel angle sensor arrangement is connected to the steering shaft to transmit steering angle change to a controller and the electric motor is responsive to a command signal generated by the steering controller. A fluid reservoir is provided for containing hydraulic fluid utilized in the hydraulic portion of the steering system. Electrical control valves may be provided in the steering system and connected to each of the first and second hydraulic lines and adapted to receive a signal from the steering controller for controlling flow of hydraulic fluid to the steering chamber.

A further object of the present invention is to provide the steering controller with a command computing circuit and a motor control circuit. The signal from the steering wheel sensor and a vehicle speed signal are transmitted to the command computing circuit and the motor control circuit outputs the command signal to control the electric motor.

It is an additional object of the present invention to also provide means for transmitting a signal which is indicative of steering wheel angle, means for transmitting a signal indicative of yaw rate, and means for transmitting a signal indicative of vehicle speed. The transmitted signals are received by the stability control means as is a signal which is indicative of the position of the steering rod. The signals are received by the stability control means so as to provide an output signal to the electric motors involved in the control operation thereby driving the hydraulic pumps at a rate which permits proper stability and steering of the vehicle.

It is a further object of the present invention to provide the hydrostatic steering system to the rear wheels of a vehicle so as to control the steering angle of the rear wheels in a manner similar to the control of the front wheels.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 1:
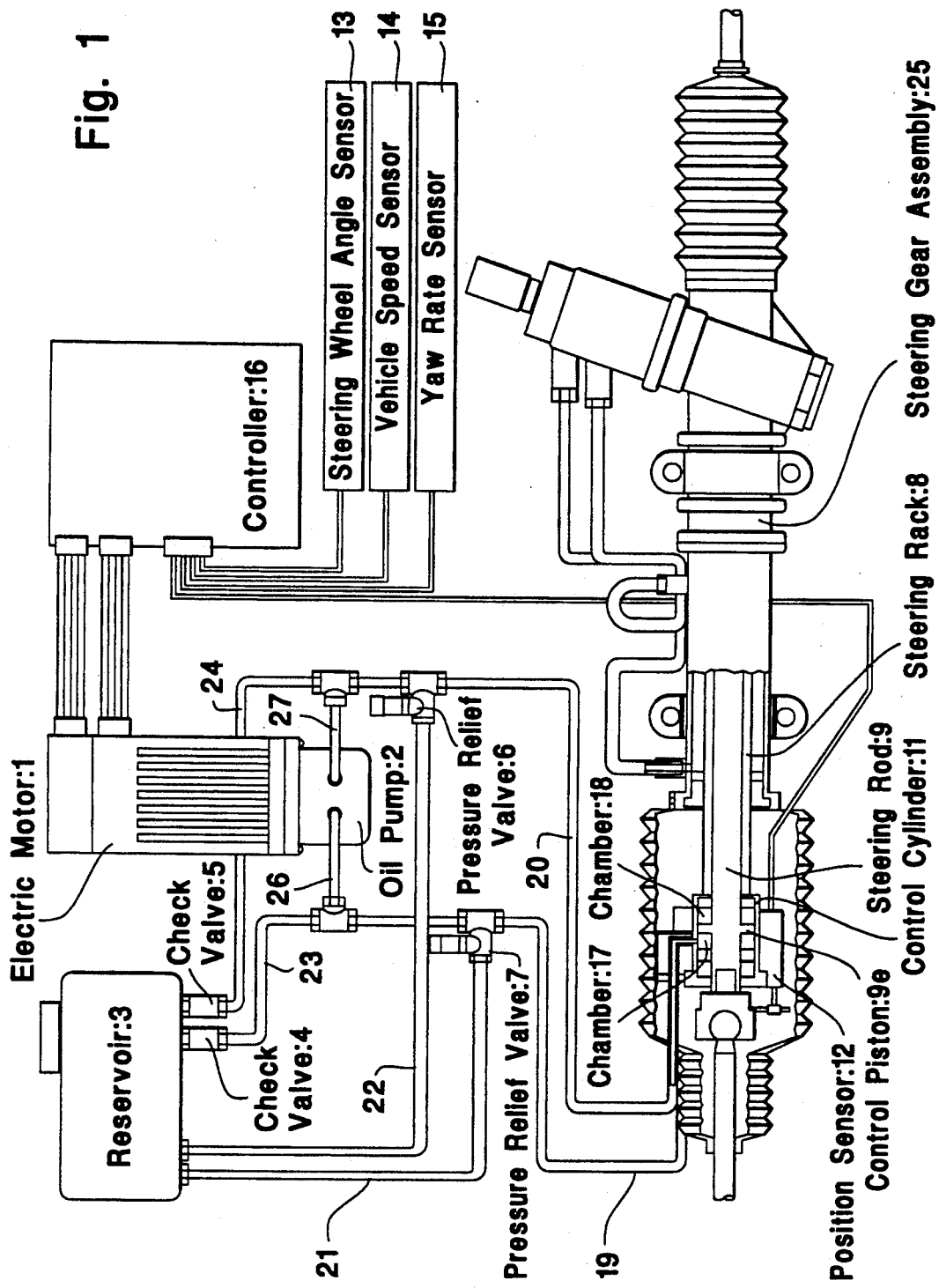
FIG. 1 is the first embodiment of the hydrostatic steering system for vehicle stability augmentation.
Figure 2:
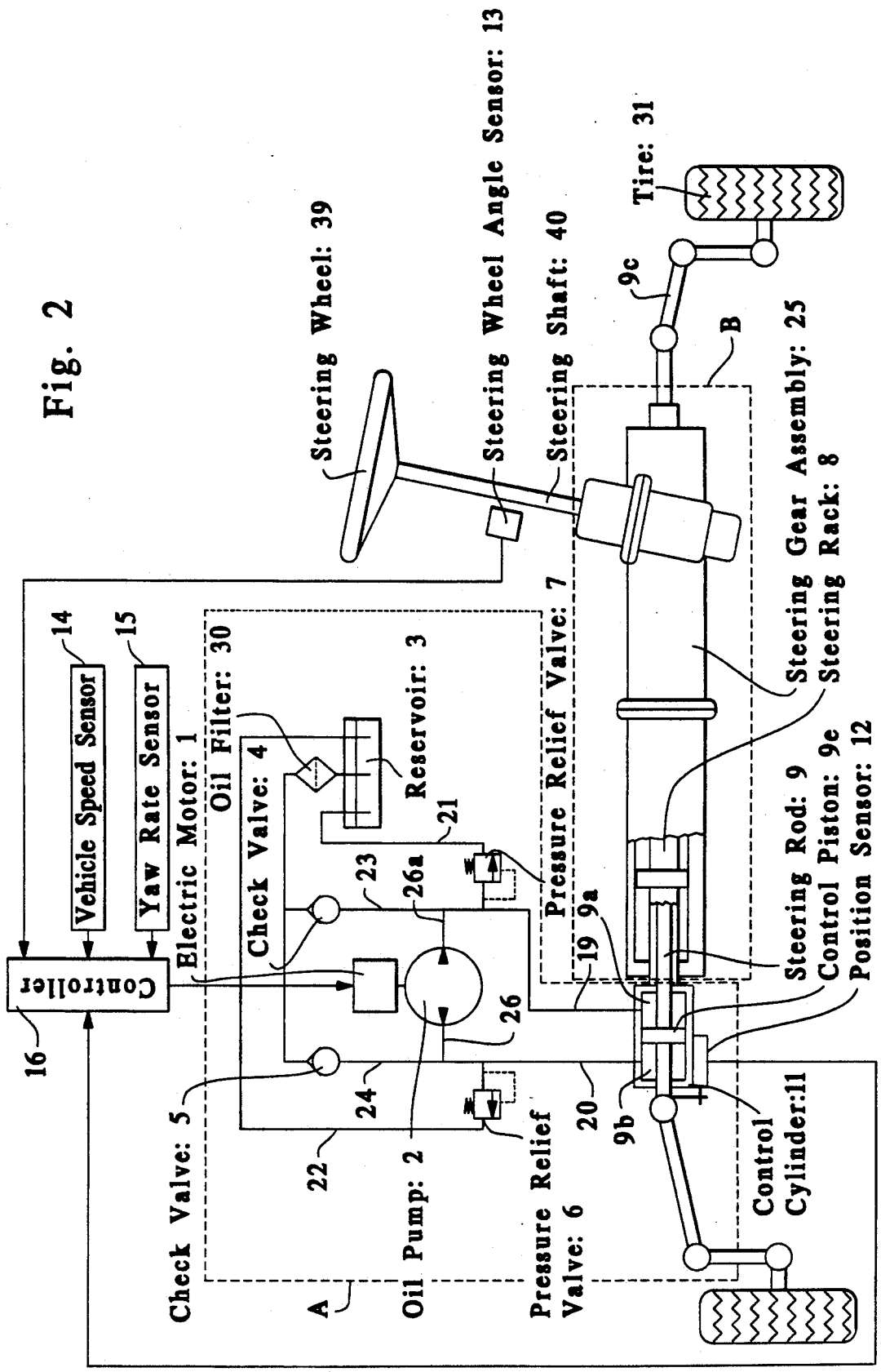
FIG. 2 is a schematic of the first embodiment.

FIGS. 1 and 2 show a configuration of the hydrostatic steering system. In FIG. 2, the power steering portion of the control is enclosed by dash lines indicated by reference B. The hydrostatic steering (stability augmentation) system is enclosed by dash lines indicated by reference A. Therein, a steering wheel 39 is connected via steering shaft 40 to a pinion gear of a steering gear assembly 25. The pinion gear is fixedly attached to the steering shaft. The pinion gear is in meshing engagement with the rack 8 of the known type of rack and pinion steering. A hydraulic pump is indicated at reference numeral 2 and is of the bidirectional type so as to provide hydraulic fluid, under pressure, to pump output conduits 26 and 26a. An electric motor 1 provides power to operate the pump 2. A reservoir 3 is provided for supplying the hydraulic fluid to the pump 2 and for receiving the working hydraulic fluid back into reservoir from a drain system to be discussed later. The hydraulic fluid is pumped, under the action of the driving electric motor 1 and bidirectional oil pump 2 from the reservoir through an oil filter 30. Hydraulic conduit 23, 24 provides the fluid to a pair of hydraulic lines 19 and 20. Fluid is supplied from the reservoir when the fluid level is low due to leakage or other flow problems. A check valve 4 is located in hydraulic line 23 as is a check valve 5 in hydraulic line 24. The check valves 4 and 5 may be of any conventional structure which would permit flow in a first direction and block flow in the opposite direction. The hydraulic fluid in lines 19 and 20 is provided to first and second steering chambers 9a and 9b, respectively. A control piston on valve land 9e separates the two chambers from one another. The hydraulic lines 19 and 20 are connected to the chambers 9a and 9b, respectively. The steering rod 9 is integral with the rack 8 and is connected, at either end, through a steering linkage 9c to the wheels 31, to be steered. A pair of hydraulic return lines 21 and 22 are interconnected with hydraulic lines 19 and 20. The hydraulic return lines are normally closed by pressure relief valves 6 and 7, respectively. The pressure relief valves may be of any known type which would open under conditions of overpressure in lines 19 and 20 so as to permit the return of the hydraulic fluid from hydraulic lines 19 and 20 through the return lines 21 and 22 to the reservoir 3. Of course, the pressure relief valves would again shut off flow of the hydraulic fluid through the hydraulic return lines upon the pressure in the system reaching equilibrium.

Figure 3:
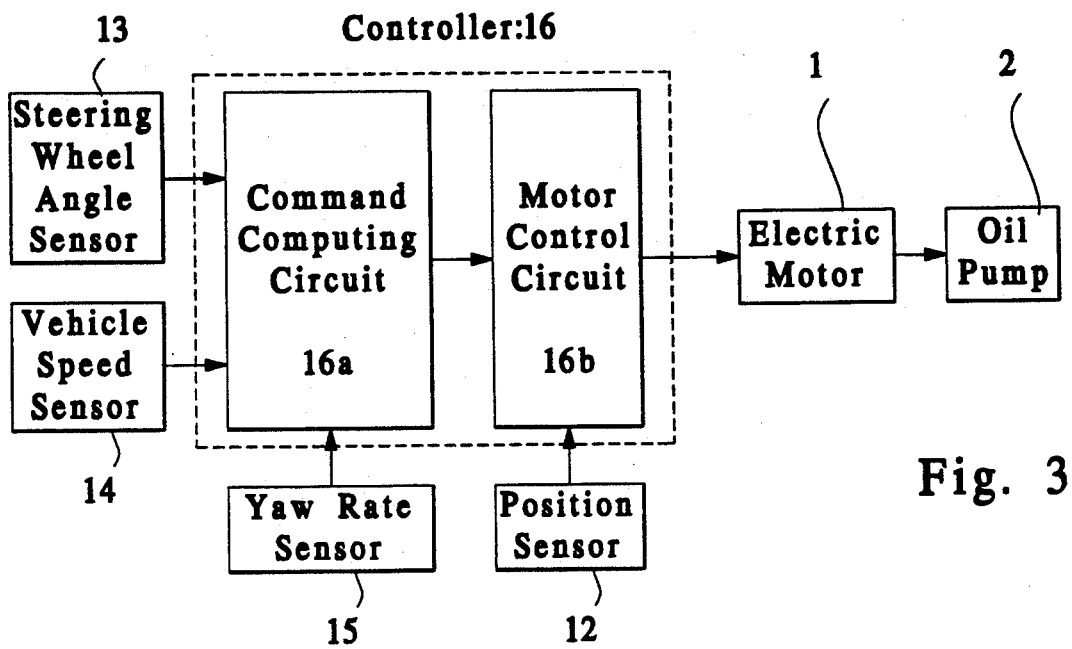
FIG. 3 is a block diagram of the first embodiment incorporating stability augmentation control.

A steering controller 16 is provided for controlling the electric motor 1 which drives the hydraulic pump 2. With reference to FIG. 3, the steering controller comprises a command computing circuit 16a and a motor control circuit 16b. In order to provide control variables to the steering controller 16, a vehicle speed sensor 14 is provided which transmits a signal indicative of the vehicle speed to the command computing circuit 16a. Steering wheel angle sensor 13 is connected with the steering shaft 40 to provide a signal which is indicative of the steering wheel angle of the steering shaft to the command computing circuit 16a. The values received by the command computing circuit 16a are transmitted to the motor control circuit 16b. The motor control circuit is connected to the electric motor 1 so as to control operation thereof and, thereby, control operation of the bidirectional oil pump 2.

A yaw rate sensor 15 also provides a signal indicative of the yaw rate of the vehicle. The signal is transmitted to the command computing circuit 16a. A position sensor 12 is operably connected to the steering linkage 9c by its connection with the steering rod 9. The position sensor transmits a signal to the motor control circuit 16b of the controller 16. The position sensor signal is indicative of the position of the steering rod 9 and steering linkage 9c.

A control cylinder 11 is mounted at one end of the steering rack 8. The control cylinder 11 is divided into two parts, as previously discussed so as to receive fluid pressure from conduits 19 and 20. The two portions of the control cylinder are, as discussed, separated by the control piston 9e. A steering rack 8 is provided as a hollow shaft and the steering rod 9 is located in the hollow steering rack 8 and connected with a tie rod. The electric motor 1, as controlled by the controller 16, is coupled to the bidirectional oil pump 2. When the control piston 9e should be moved from left to right, as shown in the drawing, the oil pump 2 is driven by the electric motor 1 to pump hydraulic fluid from the chamber 9a to the chamber 9b. The hydraulic fluid moves through conduits 19, 26a, 26 and 20 so as to permit the control piston 9e to move from the left of the drawing figure to the right of the drawing figure. If, in the case that hydraulic fluid leaks from the chambers, conduits and bidirectional oil pump, additional fluid may be supplied to make up the loss from the reservoir 3 through the oil filter 30 and check valve 4 or 5.

In the second embodiment of the invention and in all subsequently discussed embodiments of the invention, like reference numerals will be utilized to identify like elements previously discussed.

Figure 4:
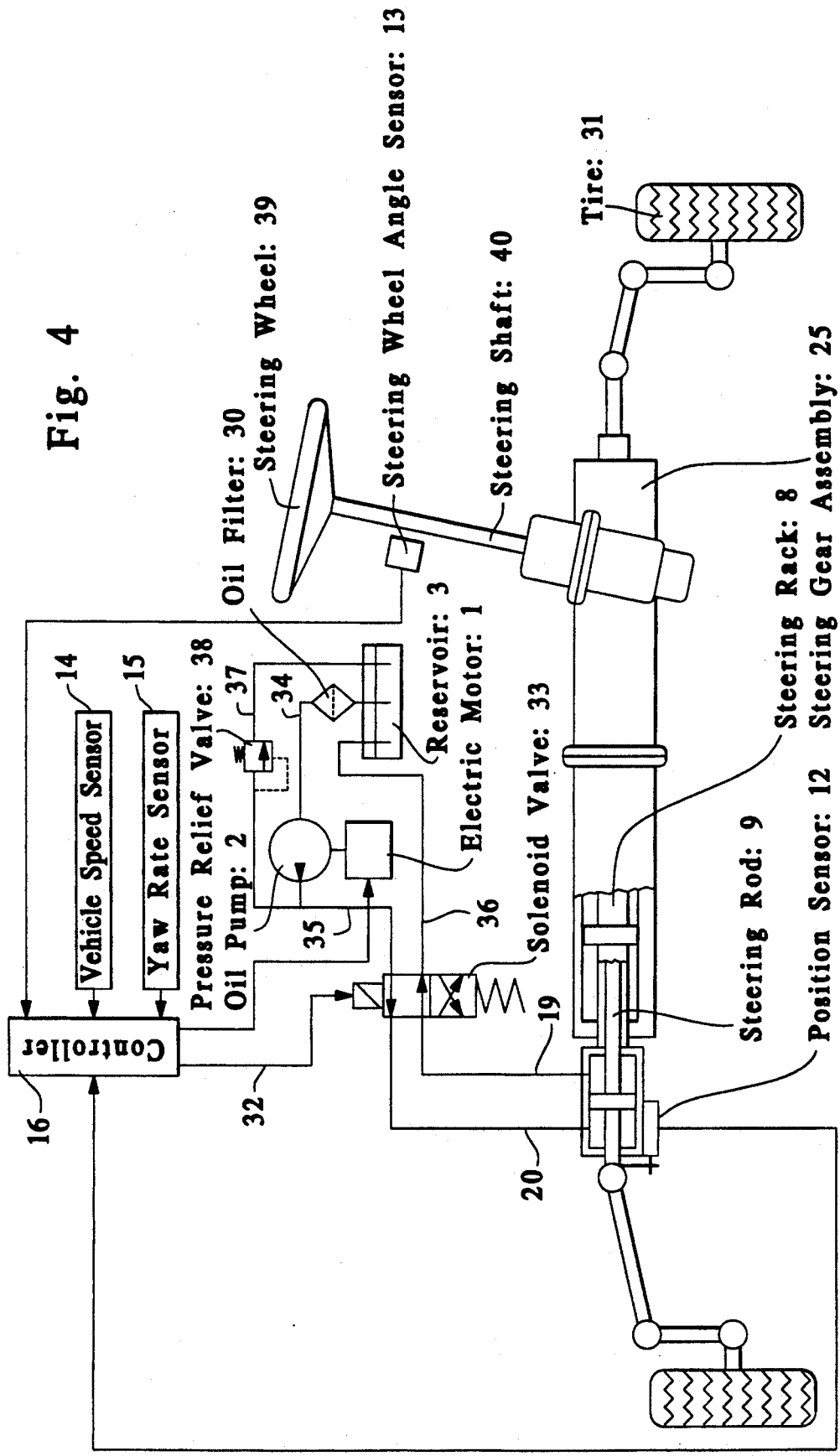
FIG. 4 is a second embodiment of the hydrostatic steering system for vehicle stability augmentation.

In the embodiment of FIG. 4, the bidirectional oil pump 2 of the first embodiment has been replaced by a unidirectional oil pump. In order to provide for the flow of hydraulic fluid to each side of the steering chamber in which the steering piston 9e is located, a solenoid valve 33 is provided. The solenoid valve receives its operational control from the steering controller 16. The oil pump 2 of FIG. 4 is provided as a unidirectional oil pump instead of the bidirectional oil pump shown in FIGS. 1 and 2. The oil pump 2 of FIG. 4 provides hydraulic fluid through a single outlet line 35 so as to permit the hydraulic fluid to be communicated to chambers 9a and 9b of the control cylinder 11. A solenoid valve 33 is provided as a two-way solenoid valve and is connected between conduits 36 and 35. The solenoid valve 33 is controlled by the controller 16 through a signal transmitted through lead 32 to the solenoid valve. In a first mode of operation, the solenoid valve 33 permits the hydraulic fluid to flow from conduit 35 through the solenoid valve to conduits 19 and 20 so as to deliver hydraulic operating fluid to the control cylinder. The chamber 9a is connected to the conduits 19 and 36 so as to provide a return flow of the hydraulic fluid to the reservoir 3. In a second mode of operation, the solenoid valve 33 is positioned, by the control signal provided by controller 16 so as to deliver hydraulic fluid from the unidirectional pump 2 through conduit 35 and 19 to the chamber 9a. The chamber 9b is then connected via conduits 20 and 36 to the reservoir 3. Accordingly, the chambers 9a and 9b can have the volume of hydraulic fluid therein adjusted so as to permit the movement of control piston 9e.

Figure 5:
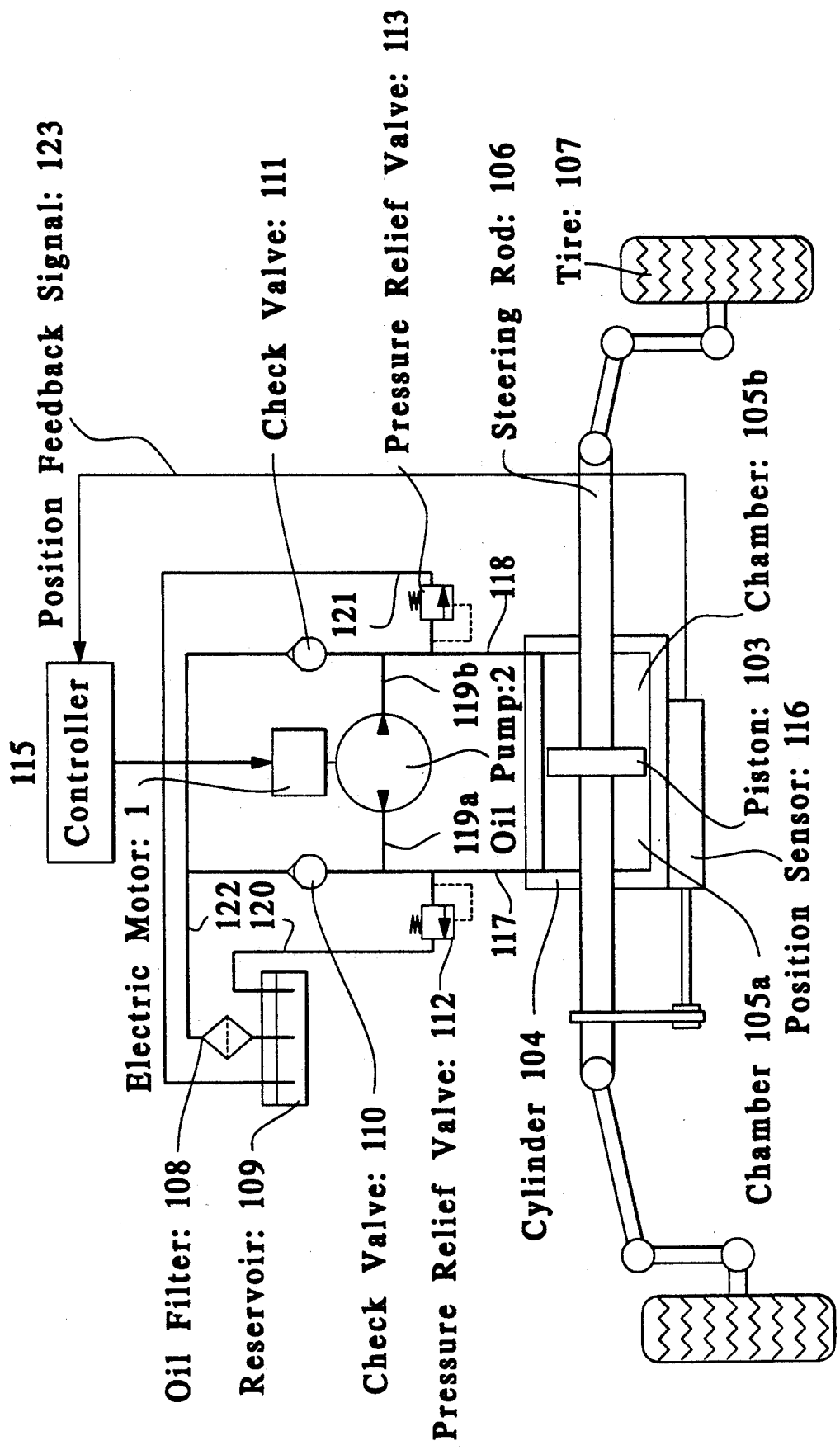
FIG. 5 is a third embodiment of the hydrostatic steering system for vehicle stability augmentation as applied to rear wheels of the vehicle.

In the embodiment of FIG. 5, the hydrostatic steering system is applied to the rear wheel control system so as to provide so-called four wheel steer or rear wheel steering. Therein, the system comprises a hydraulic cylinder 104, a steering rod 106, the bidirectional oil pump 2, an electric motor 1, an actuator controller 115 and similar elements of the front wheel steer system as discussed in the embodiment of FIG. 2. The hydraulic cylinder 104 is mounted on the chassis of the vehicle to which the steering system is supplied. The steering rod is connected to rear wheels 107 through tie rods. In the operation of the device as shown in FIG. 5, when the piston 103 should be moved from left to right due to vehicle stability, the oil pump 2 is driven by the electric motor 1 so as to remove oil from chamber 105b to chamber 105a through conduits 118, 119b, 119a and 117. Thus, the operation of FIG. 5 is similar to that of FIG. 2 except for the application of the device in combination with four wheel steering as applied to steer the rear wheels of a vehicle.

Figure 6:
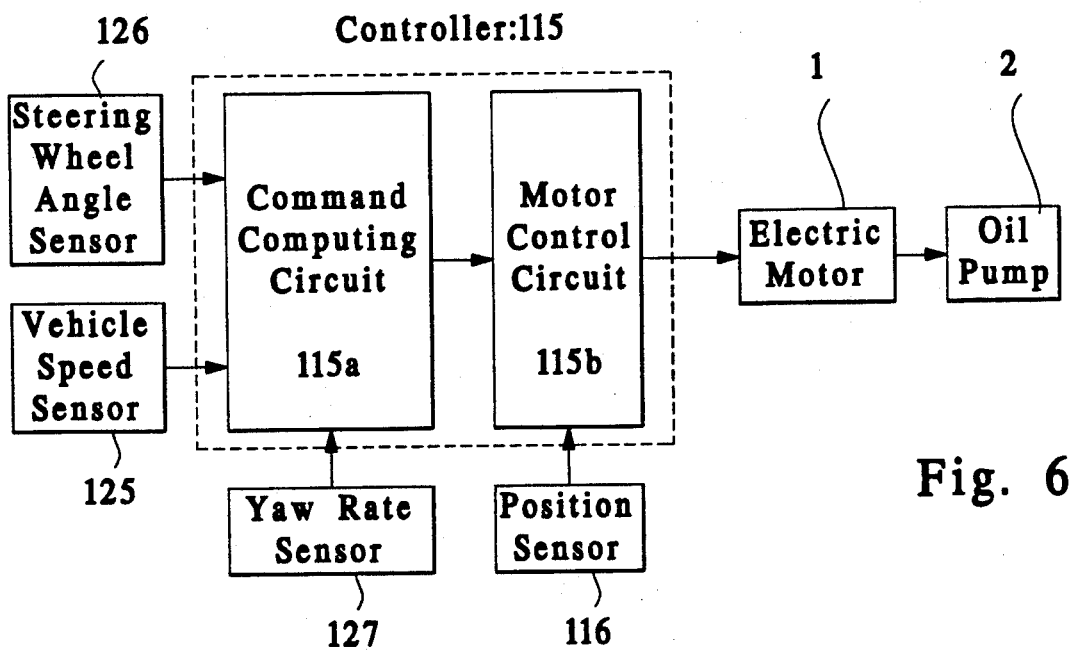
FIG. 6 is a block diagram of the third embodiment.

The embodiment of FIG. 5 incorporates a hydrostatic stability augmentation system with the hydrostatic steering system previously discussed. Reference may also be made to the block diagram shown in FIG. 6 for a schematic representation of the control system of the hydrostatic stability augmentation system.

Figure 7:
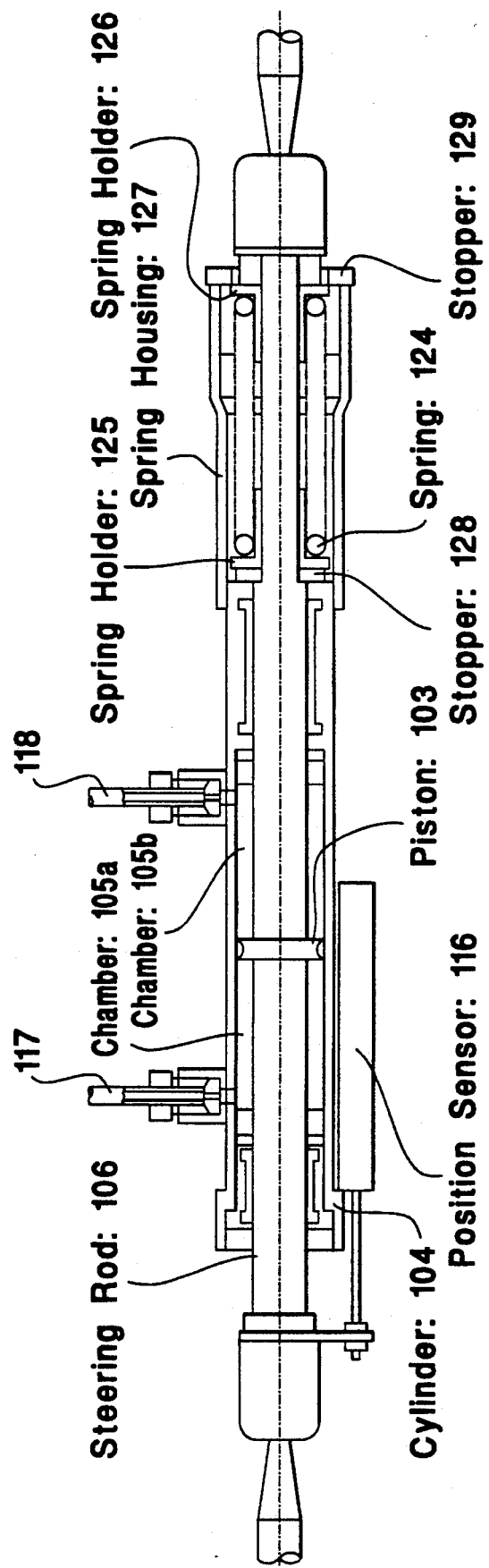
FIG. 7 is a sectional view of an actuator for the embodiment of FIG. 5.

FIG. 7 is a sectional view of the hydraulic actuator schematically represented in FIG. 5. Therein, the hydraulic lines 117 and 118 are shown connected to the chamber 105b. The position sensor 116 is shown connected to the steering rod 106 with its feedback position indicator providing a signal along line 123 to the controller 115 of FIG. 8. As discussed, the position of the position sensor is determined by movement of the steering rod 106 and movement of the position sensor is fed back to the controller. The piston 103 is movable within the chambers 105a and 105b so as to increase and/or decrease the volume of the respective chambers in which the hydraulic fluid is delivered via the hydraulic conduits 117 and 118. The chambers 105a and 105b are contained within the cylinder 104 which houses the steering rod 106. At one end of the actuator, a spring housing 127 is provided. A spring system 124 is positioned within the spring housing 127 and held in place by spring holders 125 and 126 at each end of the spring. A stopper arrangement 129 is defined at one end of the cylinder 104 adjacent the spring holder 126. A similar stopper arrangement 128 is provided adjacent the spring holder 125. The spring holders are connected to the steering rod 106 so as to provide for automatic centering of the steering rod 106 and the piston 103 carried thereon. The centering arrangement permits the piston 103 and rod 106 to be substantially equally positioned between chambers 105a and 105b when the hydrostatic system is not functioning.

Figure 8:
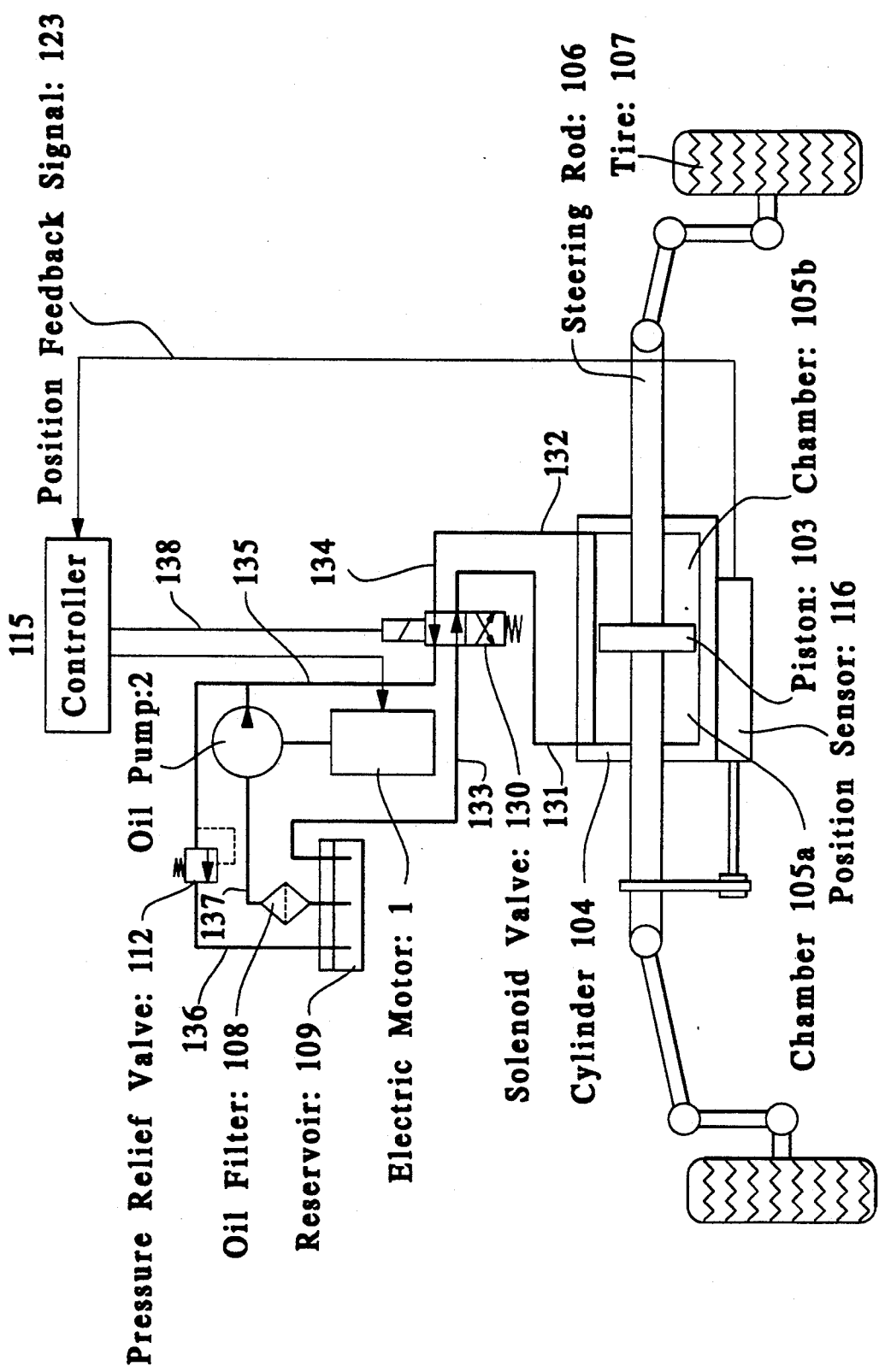
FIG. 8 is a fourth embodiment of the invention.

In the embodiment of FIG. 8, a system similar to that shown in FIG. 5 is disclosed. The system is similar to FIG. 5 with the following differences: a unidirectional oil pump 2 is provided instead of the bidirectional oil pump shown in FIG. 5. The oil pump 2 of FIG. 8 provides hydraulic fluid through a single outlet line 135 to provide the hydraulic fluid to the chambers 105a and 105b. A solenoid valve 130 is provided as a two-way solenoid valve and is connected between conduits 134 and 133. The solenoid valve 130 is controlled by the controller 115 by a signal transmitted through input 138 to the solenoid valve 130.

In a first mode of operation, the solenoid valve permits the hydraulic fluid to flow from conduit 135 through the solenoid valve to conduit 134 and 132 so as to deliver hydraulic fluid to the chamber 105b. The chamber 105a is connected to conduit 131 through the solenoid valve 130 so as to provide return flow to conduit 133 and the reservoir 109. In a second mode of operation, the solenoid valve is positioned, by the control signal provided by controller 115 so as to deliver hydraulic fluid from the unidirectional oil pump 2 through conduit 135 and conduit 131 to the chamber 105a. The chamber 105b is then connected via conduits 132 and 134 to the return line 133 which delivers the hydraulic fluid back to the reservoir 109.

When the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A vehicle steering system comprising:
   steerable wheels and steering arm means connected to said steerable wheels, and
   steering means for steering said steerable wheels, including
   a movable rack;
   a main steering gear mechanism, including a steering wheel connected to said movable rack for moving said movable rack;
   a steering chamber responsive to movement of said rack, said chamber being divided by a land into first and second chamber portions, said first chamber portion being connected to a first hydraulic line and said second chamber portion being connected to a second hydraulic line, at least a pair of said steerable wheels being connected to a control piston on said land by said steering arm means;
   a reservoir for providing hydraulic fluid to said steering system;
   sensor means for sensing an actual value for an operating condition of a vehicle;
   control means for generating an output signal in response to said sensor means;
   an oil pump;
   motor means for driving said oil pump to pump hydraulic fluid to the steering chamber to directly cause movement of said control piston;
   a first check valve positioned in said first hydraulic line;
   a second check valve positioned in said second hydraulic line;
   an oil pump outlet conduit connected from said oil pump to said first and second hydraulic lines at a location downstream of said first and second check valves;
   said control means being operably connected to said motor means to control said motor means such that said motor means is actuated in response to said output signal to drive said oil pump to provide hydraulic fluid to said steering chamber so that movement of said control piston directly results from hydraulic fluid pumped into said steering chamber by said oil pump.

2. Steering system according to claim 1, wherein said sensor means senses steering wheel angle of said vehicle.

3. Steering system according to claim 2, wherein said sensor means also senses vehicle speed of said vehicle.

4. Steering system according to claim 3, wherein said sensor means also senses yaw rate of said vehicle.

5. Steering system according to claim 1, further comprising:
   a first hydraulic return line connected to said first hydraulic line and said reservoir;
   a second hydraulic return line connected to said second hydraulic line and said reservoir;
   first and second pressure relief valves positioned in said first and second hydraulic return lines, respectively, said pressure relief valves being responsive to overpressure in said first and second hydraulic lines to reduce said overpressure by opening and permitting said hydraulic fluid to return to said reservoir.

6. Steering system of claim 3, wherein said control means comprises a command computing circuit and a motor control circuit.

7. Steering system of claim 6, wherein signals corresponding to said steering wheel angle and said vehicle speed are transmitted to said command computing circuit, and said motor control circuit outputs said command signal to said motor means.

8. Steering system of claim 1, wherein said control means includes an electrically operated valve means.

9. The steering system of claim 1, wherein said control means further comprises a position sensor connected to a steering rod which forms a part of said steering means for determining a position of said steering rod.

10. Steering system of claim 8, wherein said electrically operated valve means is a two-way solenoid valve operable to alternately connect said first and second portions of said steering chamber with said reservoir.

11. Steering system of claim 1, further comprising an actuator cylinder having said steering chamber defined within one end of said cylinder and a centering means for centering said steering means positioned at an end of the cylinder opposite to said steering chamber.

12. Steering system according to claim 11, wherein said centering means comprises a spring arrangement extending between a first spring holder and a second spring holder, each of said first and second spring holders being connected to said steering means whereby said spring returns said steering means to a predetermined position when said steering system is inoperable.

13. Steering system according to claim 1, wherein said at least a pair of steerable wheels is a pair of front wheels.

14. Steering system according to claim 1, wherein said oil pump is non-reversible.

15. A vehicle steering system comprising:
  steerable wheels and steering arm means connected to said steerable wheels, and
  steering means for steering said steerable wheels, including
    a movable shaft;
    a steering chamber divided by a land into first and second chamber portions, the first chamber portion being connected to a first hydraulic line and the second chamber portion being connected to a second hydraulic line, at least a pair of said steerable wheels connected to a control piston on said land by said steering arm means;
    a reservoir for providing hydraulic fluid to said steering system;
    sensor means for sensing an actual value for an operating condition of a vehicle;
    control means for generating an output signal in response to said sensor means;
    an oil pump;
    motor means for driving said oil pump to pump hydraulic fluid to the steering chamber to directly cause movement of said control piston;
    a first check valve positioned in said first hydraulic line;
    a second check valve positioned in said second hydraulic line;
    an oil pump outlet conduit connected from said oil pump to said first and second hydraulic lines at a location downstream of said first and second check valves;
    said control means being operably connected to said motor means whereby said motor means is actuated in response to said output signal to drive said oil pump to provide hydraulic fluid to said steering chamber so that movement of said control piston directly results from hydraulic fluid pumped into said steering chamber by said oil pump.

16. Steering system according to claim 15, wherein said sensor means senses steering wheel angle.

17. Steering system according to claim 16, wherein said sensor means senses vehicle speed of said vehicle.

18. Steering system according to claim 17, wherein said sensor means senses yaw rate of said vehicle.

19. Steering system according to claim 15, further comprising:
  a first hydraulic return line connected to said first hydraulic line and said reservoir;
  a second hydraulic return line connected to said second hydraulic line and said reservoir;
  first and second pressure relief valves positioned in said first and second hydraulic return lines respectively, said pressure relief valves being responsive to overpressure in said first and second hydraulic lines to reduce said overpressure by opening and permitting said hydraulic fluid to return to said reservoir.

20. Steering system of claim 17, wherein said control means comprises a command computing circuit and a motor control circuit.

21. Steering system of claim 20, wherein signals corresponding to said steering wheel angle and said vehicle speed are transmitted to said command computing circuit, and said motor control circuit outputs said command signal to said electric motor.

22. Steering system of claim 15, wherein said control means includes an electrically operated valve means.

23. The steering system of claim 15, wherein said control means further comprises a position sensor connected to a steering rod which forms a part of said steering means for determining a position of said steering rod.

24. Steering system of claim 22, wherein said electrically operated valve means is a two-way solenoid valve operable to alternately connect said first and second portions of said chamber with said reservoir.

25. Steering system of claim 15, further comprising an actuator cylinder having said steering chamber defined within one end of said cylinder and a centering means for centering said steering means positioned at an end of the cylinder opposite to said steering chamber.

26. Steering system according to claim 25, wherein said centering means comprises a spring arrangement extending between a first spring holder and a second spring holder, each of said first and second spring holders being connected to said steering means whereby said spring returns said steering means to a predetermined position when said steering system is inoperable.

27. Steering system according to claim 15, wherein said at least a pair of steerable wheels is a pair of rear wheels.

28. Steering system according to claim 15, said oil pump is nonreversible.

* * * * *